(12) United States Patent
Espinoza et al.

(10) Patent No.: US 9,805,574 B1
(45) Date of Patent: Oct. 31, 2017

(54) VEHICLE CHILD SAFETY ALERT SYSTEM

(71) Applicants: Carlos Espinoza, Homestead, FL (US); Ana Lila Espinoza, Homestead, FL (US)

(72) Inventors: Carlos Espinoza, Homestead, FL (US); Ana Lila Espinoza, Homestead, FL (US)

( * ) Notice: Subject to any disclaimer, the term of this patent is extended or adjusted under 35 U.S.C. 154(b) by 0 days.

(21) Appl. No.: 15/391,932

(22) Filed: Dec. 28, 2016

(51) Int. Cl.
*G08B 21/02* (2006.01)
*B60N 2/00* (2006.01)
*B60Q 9/00* (2006.01)

(52) U.S. Cl.
CPC ......... *G08B 21/0205* (2013.01); *B60N 2/002* (2013.01); *B60Q 9/00* (2013.01); *G08B 21/0261* (2013.01)

(58) Field of Classification Search
CPC ............ G08B 21/0205; G08B 21/0261; B60N 2/002; B60Q 9/00
USPC ......................................... 340/438
See application file for complete search history.

(56) References Cited

U.S. PATENT DOCUMENTS

| | | | |
|---|---|---|---|
| 7,009,522 B2 | 3/2006 | Flanagan | |
| 7,230,530 B1 | 6/2007 | Almquist | |
| D650,715 S | 12/2011 | Hill | |
| 8,841,997 B2 | 9/2014 | Silveira | |
| 9,682,638 B1* | 6/2017 | McCurdy | B60N 2/002 |
| 9,691,249 B1* | 6/2017 | Keys | G08B 21/0205 |
| 2006/0033613 A1 | 2/2006 | Reece | |
| 2006/0061201 A1 | 3/2006 | Skinner | |
| 2007/0075574 A1 | 4/2007 | James | |
| 2007/0075575 A1 | 4/2007 | Gregory | |
| 2007/0222622 A1 | 9/2007 | Sweeney | |
| 2008/0316043 A1 | 12/2008 | Gomes | |
| 2014/0266694 A1* | 9/2014 | McCluskey | G08B 21/0453 340/539.12 |
| 2015/0137962 A1* | 5/2015 | Binnicker | B60Q 9/00 340/457 |
| 2015/0332578 A1* | 11/2015 | Borgne | B60N 2/26 340/667 |
| 2016/0193960 A1* | 7/2016 | Barabas | B60Q 9/00 340/457 |
| 2016/0379459 A1* | 12/2016 | Trang | G08B 21/023 340/457 |
| 2017/0001560 A1* | 1/2017 | Roisen | G08B 21/24 |
| 2017/0028811 A1* | 2/2017 | Jayasundera | B60H 1/00742 |
| 2017/0046937 A1* | 2/2017 | Chacon, Jr. | B60N 2/002 |

FOREIGN PATENT DOCUMENTS

WO 03030118 A2 4/2003

* cited by examiner

Primary Examiner — Hirdepal Singh

(57) ABSTRACT

The vehicle child safety alert system comprises a seat sensor and an alarm fob. The seat sensor is installed in a child safety seat in order to detect a passenger. When a passenger is detected in the child safety seat the seat sensor queries the GPS for the GPS coordinates of the seat sensor. The GPS coordinates of the location of the seat sensor are wirelessly transmitted to the alarm fob. The alarm fob receives the GPS coordinates of the location of the seat sensor and compares the GPS coordinates of the location of the seat sensor to the GPS coordinates of the location of the alarm fob. If the distance between the GPS coordinates of the location of the seat sensor and the GPS coordinates of the location of the alarm fob is greater than a maximum allowable distance the alarm fob generates an alarm.

3 Claims, 5 Drawing Sheets

VEHICLE CHILD SAFETY ALERT SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicles and vehicle accommodations not otherwise provided for, more specifically, a passenger detection system.

SUMMARY OF INVENTION

The vehicle child safety alert system is adapted for use with a child safety seat. The child safety seat is installed in a vehicle. The vehicle child safety alert system comprises a seat sensor and an alarm fob. The seat sensor is mounted in the child safety seat and detects when a passenger is in the child safety seat. When a passenger is detected in the child safety seat the seat sensor queries the GPS for the GPS coordinates of the seat sensor. The GPS coordinates of the location of the seat sensor are wirelessly transmitted to the alarm fob. The alarm fob receives the GPS coordinates of the location of the seat sensor and compares the GPS coordinates of the location of the seat sensor to the GPS coordinates of the location of the alarm fob. If the distance between the GPS coordinates of the location of the seat sensor and the GPS coordinates of the location of the alarm fob is greater than a maximum allowable distance the alarm fob generates an alarm.

These together with additional objects, features and advantages of the vehicle child safety alert system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle child safety alert system in detail, it is to be understood that the vehicle child safety alert system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle child safety alert system.

It is therefore important that the claims be regarded as including such equivalent construction insofar as they do not depart from the spirit and scope of the vehicle child safety alert system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
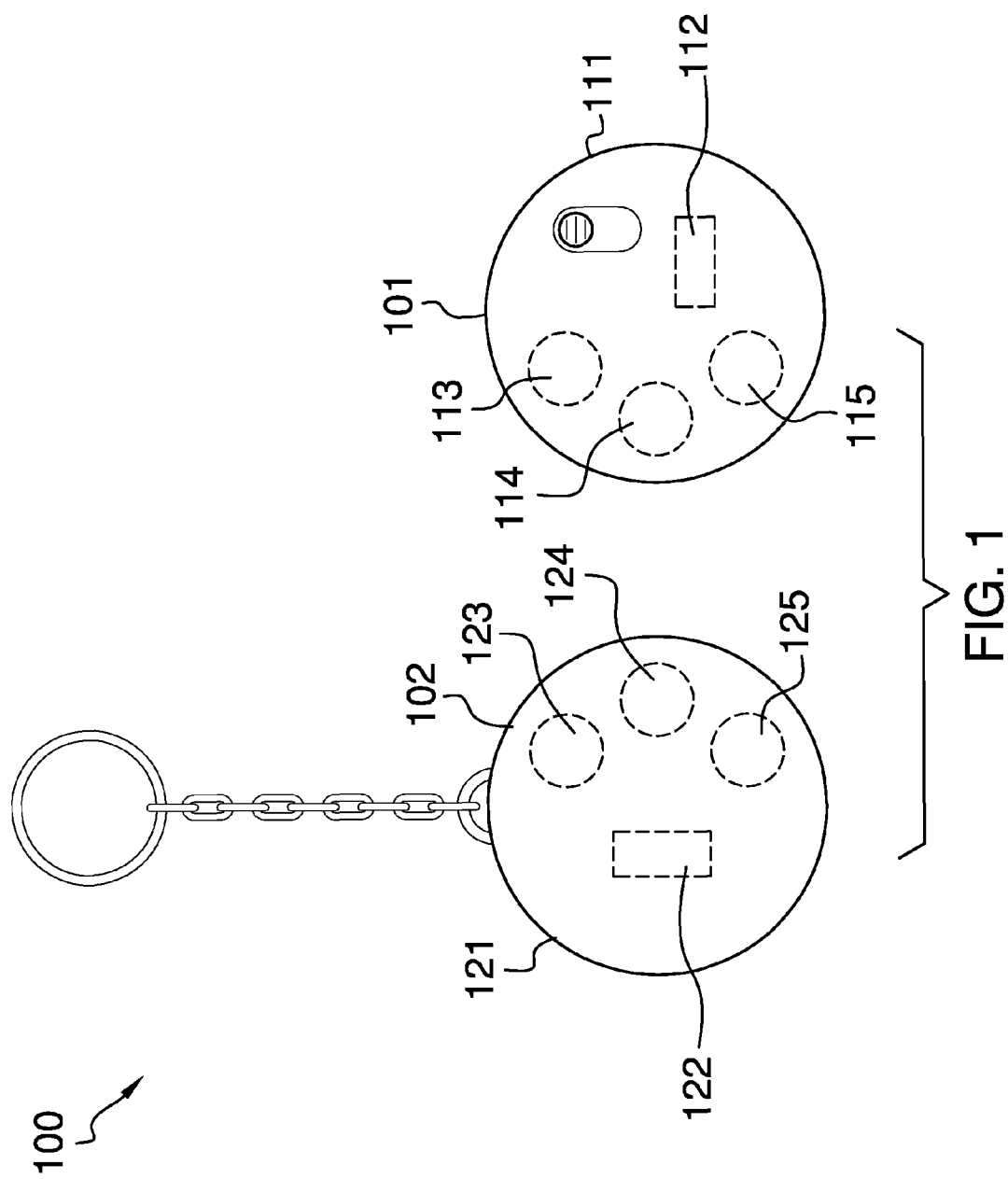
FIG. 1 is a front view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

The vehicle child safety alert system 100 (hereinafter invention) is adapted for use with a child safety seat 161. The child safety seat 161 is installed in a vehicle 163. The child safety seat 161 is a readily and commercially available safety device that is used to anchor a passenger 162 within a vehicle 163 in a manner that minimizes injury during a vehicle 163 accident. The passenger 162 is defined as the occupant of the child safety seat 161. The invention 100 comprises a seat sensor 101 and an alarm fob 102. The seat sensor 101 is mounted in the child safety seat 161 and detects when a passenger 162 is in the child safety seat 161. When a passenger 162 is detected in the child safety seat 161 the seat sensor 101 queries the GPS for the GPS coordinates of the seat sensor 101. The GPS coordinates of the location of the seat sensor 101 are wirelessly transmitted to the alarm fob 102. The alarm fob 102 receives the GPS coordinates of the location of the seat sensor 101 and compares the GPS coordinates of the location of the seat sensor 101 to the GPS coordinates of the location of the alarm fob 102. If the span of the distance between the GPS coordinates of the location of the seat sensor 101 and the GPS coordinates of the location of the alarm fob 102 is greater than a predetermined maximum allowable distance the alarm fob 102 generates an audible alarm.

The seat sensor 101 is mounted in the child safety seat 161 for the purpose of detecting whether a passenger 162 is in the child safety seat 161. In the first potential embodiment of the disclosure, the seat sensor 101 is designed to detect the body temperature of the passenger 162. The seat sensor 101 comprises a sensor housing 111, a first logic module 112, a first GPS module 113, a first communication module 114, a first battery 115, and a temperature sensor 116. The first logic module 112, the first GPS module 113, the first communication module 114, the first battery 115, and the temperature sensor 116 are contained within the sensor housing 111. The first GPS module 113, the first communication module 114, the first battery 115, and the temperature sensor 116 are electrically connected to the first logic module 112.

The sensor housing 111 is a first rigid case within which the balance of the seat sensor 101 is contained. The use of housings with electronic devices is well known and documented in the electrical arts.

The first logic module 112 is a readily and commercially available programmable electronic device that is used to manage, regulate, and operate the seat sensor 101. The use of logic modules is well known and documented in the electrical arts. The first GPS module 113 is a readily and commercially available electronic device that communicates with the GPS to determine the GPS coordinates of the first GPS module 113. When queried by the first logic module 112 the first GPS module 113 transfers the GPS coordinates to the first logic module 112.

The first communication module 114 is a readily and commercially available wireless electronic communication device that allows the seat sensor 101 to communicate with the alarm fob 102. In the first potential embodiment of the disclosure, the first communication module 114 is selected from the group consisting of an 802.3 protocol device or a Bluetooth protocol device. The first communication module 114 and the second communication module 124 are matched such that they will communicate.

The first battery 115 is a readily and commercially available chemical storage device that provides electrical power to the seat sensor 101.

The temperature sensor 116 is a readily and commercially available sensor that is used to measure the temperature of an object. In the first potential embodiment of the disclosure, the temperature sensor 116 is selected from the group consisting of a thermocouple or a thermistor. The use of temperature sensors 116 in electrical circuits is well known and documented in the electrical arts.

The alarm fob 102 is a handheld device that is carried by the operator of the vehicle 163. The alarm fob 102 receives messages from the seat sensor 101 and initiates an alarm when the span of the distance between the seat sensor 101 and the alarm fob 102 is greater than a predetermined maximum allowable distance. The alarm fob 102 comprises an alarm housing 121, a second logic module 122, a second GPS module 123, a second communication module 124, a second battery 125, and a speaker 126. The second logic module 122, the second GPS module 123, the second communication module 124, the second battery 125, and the speaker 126 are contained within the alarm housing 121. The second GPS module 123, the second communication module 124, the second battery 125, and the speaker 126 are electrically connected to the second logic module 122.

The alarm housing 121 is a second rigid case within which the balance of the alarm fob 102 is contained. The alarm housing 121 is formed with an aperture that allows audible sounds to escape the alarm housing 121. The use of housings with electronic devices is well known and documented in the electrical arts.

The second logic module 122 is a readily and commercially available programmable electronic device that is used to manage, regulate, and operate the alarm fob 102. The use of logic modules is well known and documented in the electrical arts. The second GPS module 123 is a readily and commercially available electronic device that communicates with the GPS to determine the GPS coordinates of the second GPS module 123. When queried by the second logic module 122 the second GPS module 123 transfers the GPS coordinates to the second logic module 122.

The second communication module 124 is a readily and commercially available wireless electronic communication device that allows the seat sensor 101 to communicate with the alarm fob 102. In the first potential embodiment of the disclosure, the second communication module 124 is selected from the group consisting of an 802.3 protocol device or a Bluetooth protocol device. The first communication module 114 and the second communication module 124 are matched such that they will communicate.

The second battery 125 is a readily and commercially available chemical storage device that provides electrical power to the alarm fob 102.

The speaker 126 is a readily and commercially available transducer. In the first potential embodiment of the disclosure, the speaker 126 is a buzzer. The use of speakers 126 is well known and documented in the electrical arts.

The operation of the invention 100 is described in the following two paragraphs.

This paragraph describes the operation of the seat sensor 101. The first logic module 112 takes a first action 131 of determining the temperature measured by the temperature sensor 116. The first logic module 112 makes a first decision 141 of whether the temperature sensor 116 is measuring the body temperature of a passenger 162 in the child safety seat 161. If the temperature sensor 116 is detecting a temperature consistent with the temperature of a body the assumption is made that a passenger 162 is in the child safety seat 161. If the first logic module 112 does not detect a passenger 162, the first logic module 112 loops back to the first action 131. If the first logic module 112 does detect a passenger 162, the first logic module 112 takes a second action 132 of querying the first GPS module 113 to get the GPS coordinates of the seat sensor 101. The first logic module 112 then takes a third action 133 of sending a first message 151 through the first communication module 114 to the second communication module 124. The first message 151 is a notification that is sent from the first logic module 112 to the second logic module 122. The first message 151 notifies the second logic module 122: 1) that a passenger 162 has been detected in the child safety seat 161; and, 2) of the GPS coordinates of the seat sensor 101. The first logic module 112 then loops back to the first action 131.

This paragraph describes the operation of the alarm fob 102. The second logic module 122 takes a fourth action 134 of querying the second communication module 124. The second logic module 122 makes a second decision 142 to determine if the first message 151 has been received. If the second logic module 122 determines that the first message 151 has not been received, the second logic module 122 loops back to the fourth action 134. If the second logic module 122 determines that the first message 151 has been received, the second logic module 122 takes a fifth action 135 of querying the second GPS module 123 to get the GPS coordinates of the alarm fob 102. The second logic module 122 next takes a sixth action 136 of comparing the GPS coordinates of the seat sensor 101 to the GPS coordinates of the alarm fob 102. The second logic module 122 makes a third decision 143 to determine whether the span of the distance between the seat sensor 101 and the alarm fob 102 is greater than a predetermined allowable maximum distance. If span of the distance between the seat sensor 101 and the alarm fob 102 is greater than the predetermined allowable maximum distance then: 1) the second logic module 122 takes an eighth action 138 of initiating an audible alarm over the speaker 126; and, 2) the second logic module 122 loops back to the fifth action 135. If span of the distance between the seat sensor 101 and the alarm fob 102 is not greater than the predetermined allowable maximum distance then: 1) the second logic module 122 takes a seventh action 137 of discontinuing the audible alarm over the speaker 126; and, 2) the second logic module 122 loops back to the fourth action 134.

It shall be noted that the invention 100 may be designed to interface with a 3$^{rd}$ party monitoring service. The 3$^{rd}$ part monitoring service is currently available on different automobiles of different auto manufacturers, and typically monitors the location of the vehicle and if the vehicle has been in an accident. This interfacing with the invention 100 would further enable those services to initiate contact with emergency personnel and also to turn on the vehicle so that the AC system could operate and provide air-conditioning for occupants of the vehicle.

The following definitions were used in this disclosure:

Anchor: As used in this disclosure, anchor means to hold an object firmly or securely.

Battery: As used in this disclosure, a battery is a container consisting of one or more cells, in which chemical energy is converted into electricity and used as a source of power.

Buzzer: As used in this disclosure, a buzzer is two lead electrical device that generates an audible sound when voltage is applied to the two leads.

Exterior: As used in this disclosure, the exterior is use as a relational term that implies that an object is not contained within the boundary of a structure or a space.

GPS: As used in this disclosure, depending on the context GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Handheld: As used in this disclosure, when referring to an item or device, handheld means that the item or device is small and light enough to be operated while a person holds the item or device in their hands.

Housing: As used in this disclosure, a housing is a rigid casing that encloses and protects one or more devices.

Interior: As used in this disclosure, the interior is use as a relational term that implies that an object is contained within the boundary of a structure or a space.

Logic Module: As used in this disclosure, a logic module is an electrical device that is programmable and that accepts digital and analog inputs, processes the digital and analog inputs according to previously stored instruction and provides the results of these instructions as digital or analog outputs.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Speaker: As used in this disclosure, a speaker is an electrical device that converts an electrical signal into an audible sound.

Transceiver: As used in this disclosure, a transceiver is a device that is used to transmit and receive radio signals.

Transducer: As used in this disclosure, a transducer is a device that converts a physical quantity, such as pressure or brightness into an electrical signal or a device that converts an electrical signal into a physical quantity.

Vehicle: As used in this disclosure, a vehicle is a motorized device that is used transporting and carrying passengers, goods, or equipment.

Figure 2:
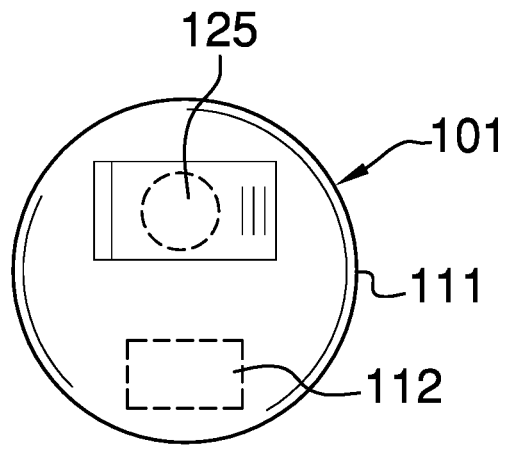
FIG. 2 is a detail view of an embodiment of the disclosure.
Figure 3:
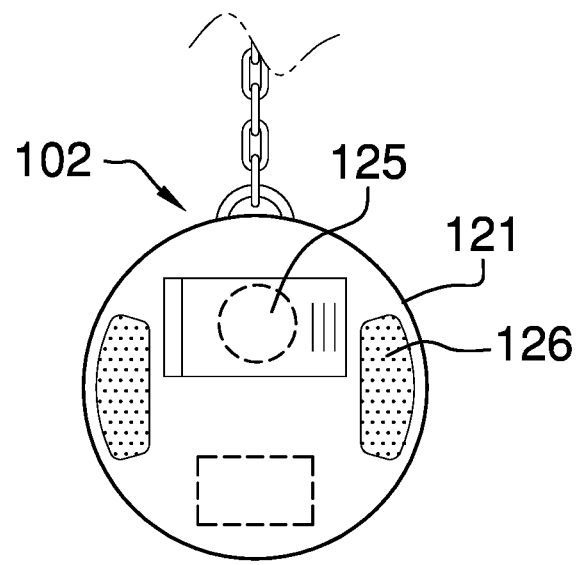
FIG. 3 is a detail view of an embodiment of the disclosure.
Figure 4:
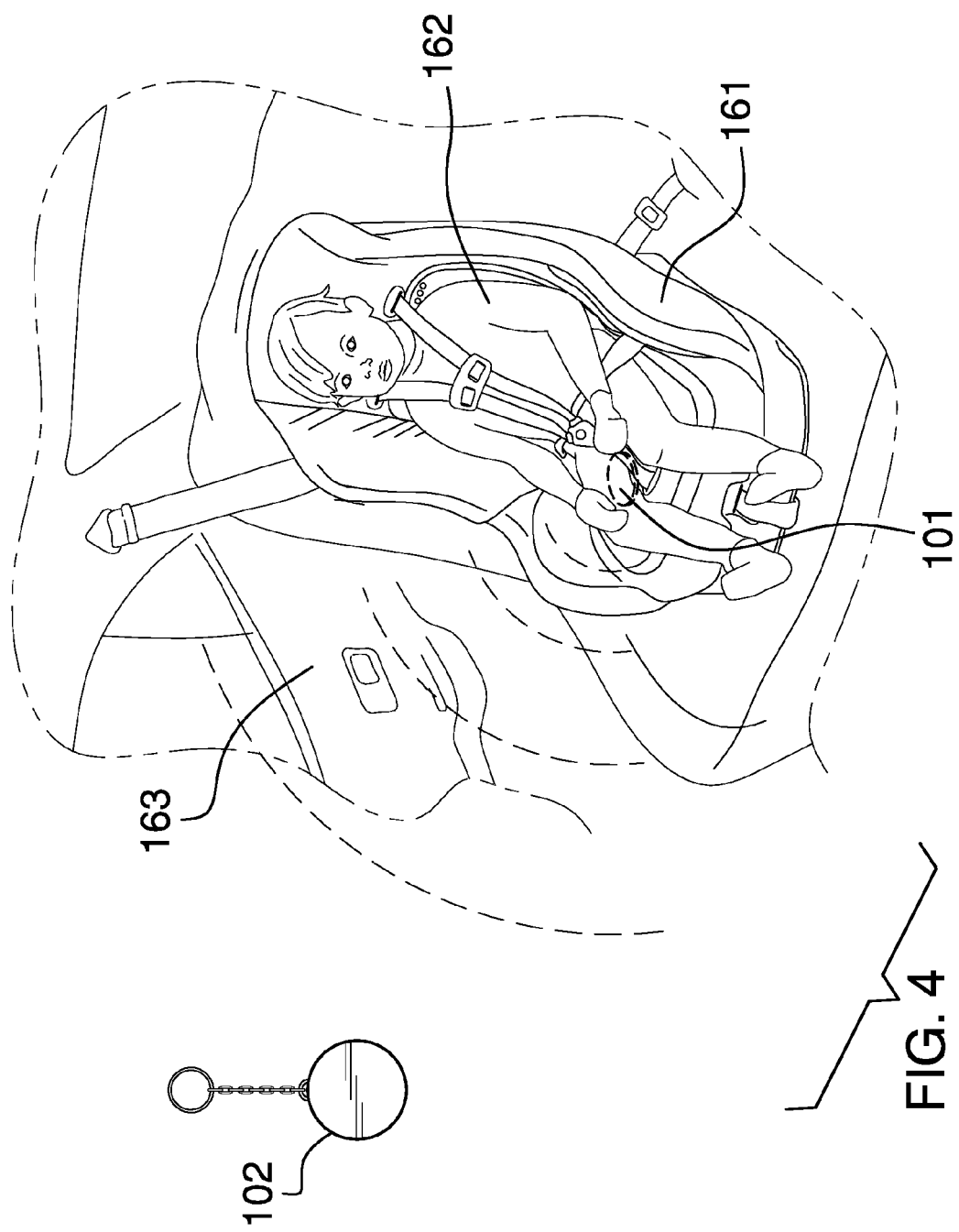
FIG. 4 is an in use view of an embodiment of the disclosure.
Figure 5:
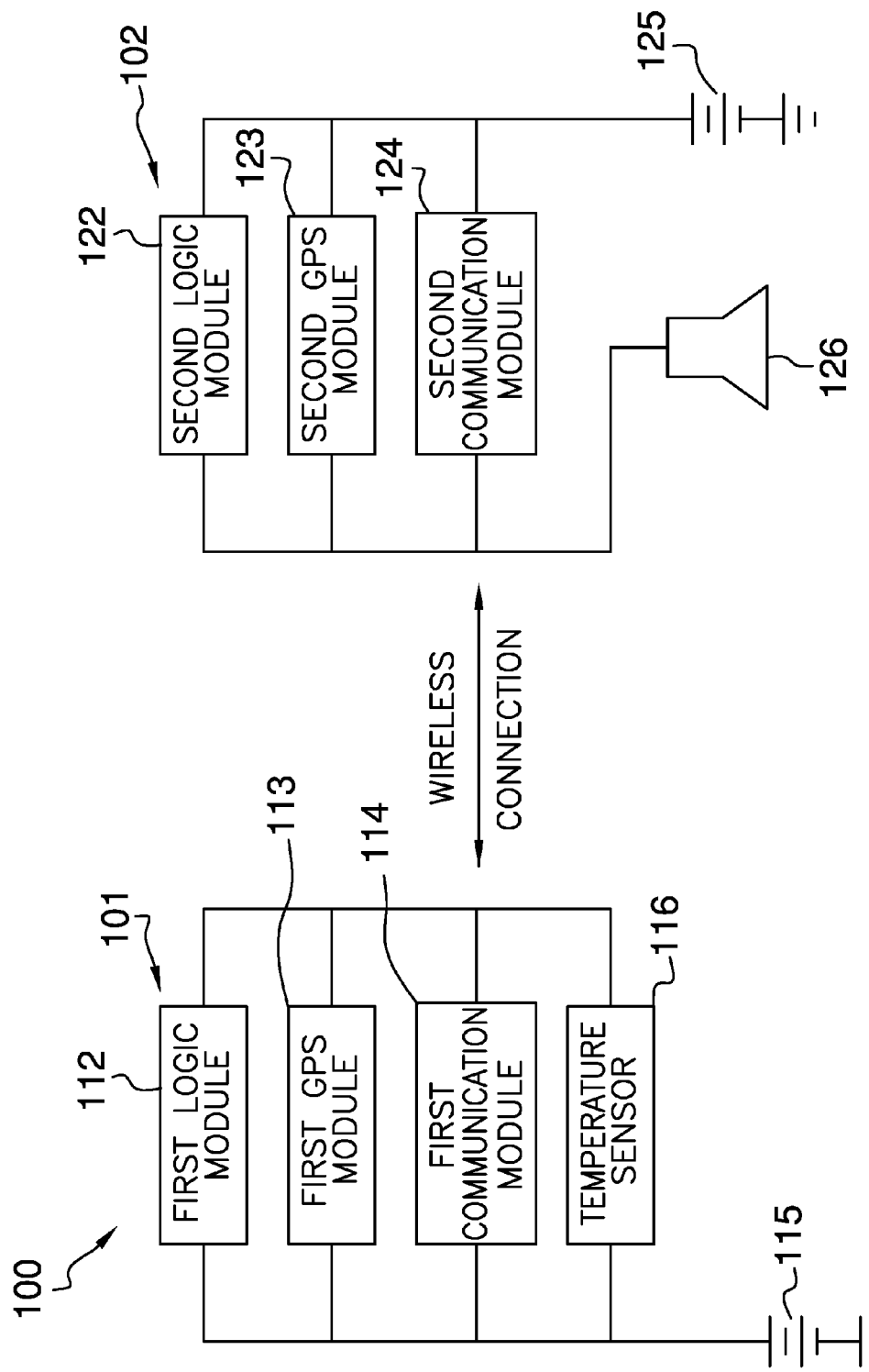
FIG. 5 is a block diagram of an embodiment of the disclosure.
Figure 6:
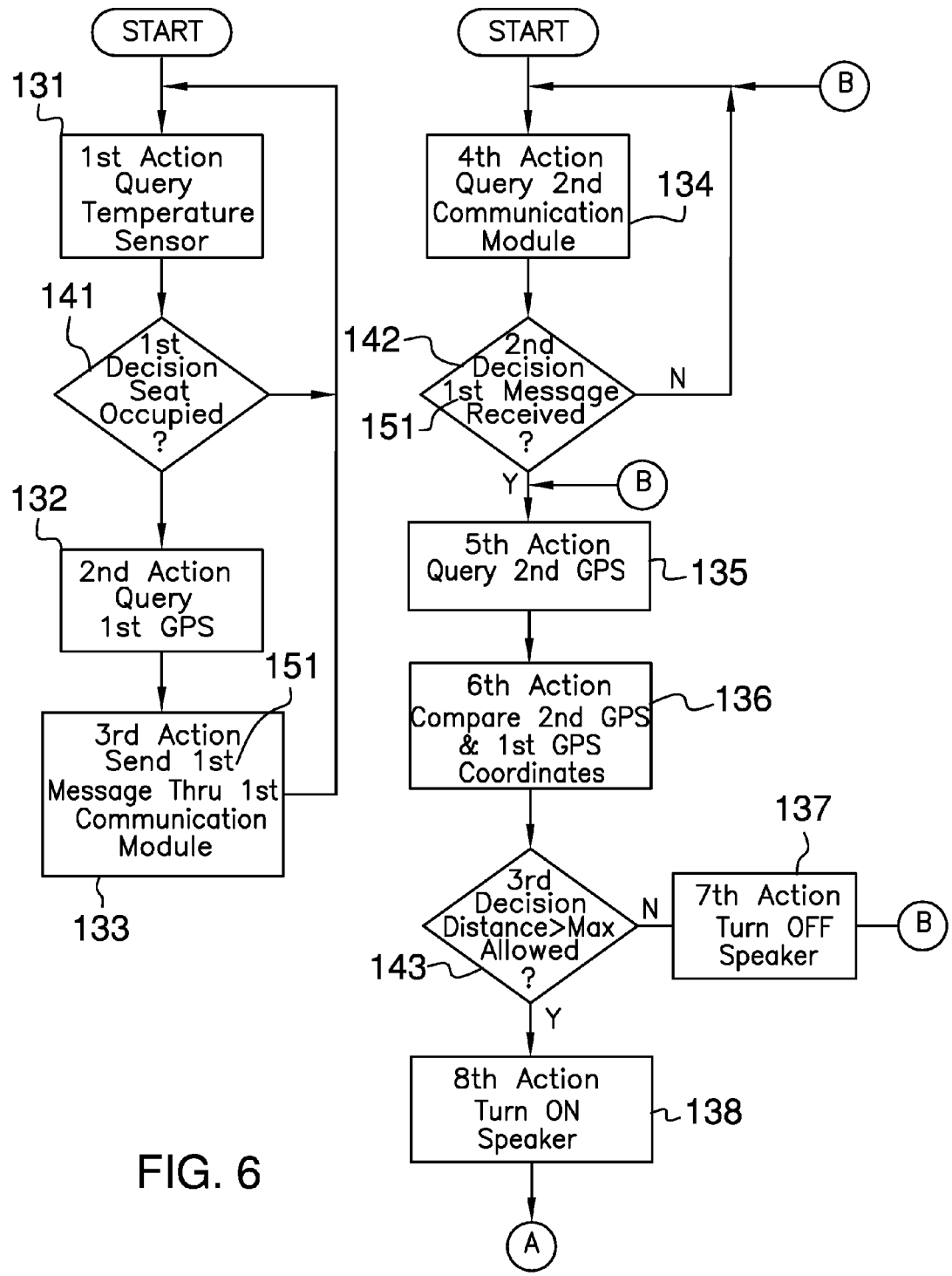
FIG. 6 is flowchart of an embodiment of the disclosure.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A passenger detection and safety system comprising:
   seat sensor and an alarm fob;
   wherein the passenger detection and safety system is configured for use with a child safety seat;
   wherein the child safety seat is installed in a vehicle;
   wherein the child safety seat is adapted for use with a passenger;
   wherein the seat sensor is mounted in the child safety seat;
   wherein the seat sensor detects when a passenger is in the child safety seat;
   wherein the alarm fob is carried into the exterior of the vehicle
   wherein if the span of the distance between the seat sensor and the alarm fob is greater than a predetermined maximum allowable distance then the alarm fob generates an audible alarm;
   wherein the seat sensor is designed to detect the body temperature of the passenger;
   wherein the seat sensor comprises a sensor housing, a first GPS module, a first communication module, a first battery, and a temperature sensor;
   wherein the first GPS module, the first communication module, the first battery, and the temperature sensor are contained within the sensor housing;
   wherein the sensor housing is a first rigid case;
   wherein the first GPS module is an electronic device that communicates with the GPS to determine the GPS coordinates of the first GPS module;
   wherein the first communication module is a wireless electronic communication device that allows the seat sensor to communicate with the alarm fob;
   wherein the temperature sensor is measures the temperature of the child safety seat;
   wherein in the temperature sensor is selected from the group consisting of a thermocouple or a thermistor;
   wherein the alarm fob is a handheld device;
   wherein the alarm fob receives messages from the seat sensor and initiates an alarm when the span of the distance between the seat sensor and the alarm fob is greater than the predetermined maximum allowable distance;

wherein the alarm fob comprises an alarm housing, a second GPS module, a second communication module, a second battery, and a speaker;

wherein the second GPS module, the second communication module, the second battery, and the speaker are contained within the alarm housing;

wherein the alarm housing is a second rigid case;

wherein the alarm housing is formed with an aperture that allows audible sounds to escape the alarm housing;

wherein the second GPS module is an electronic device that communicates with the GPS to determine the GPS coordinates of the second GPS module;

wherein the second communication module is a wireless electronic communication device that allows the seat sensor to communicate with the alarm fob;

wherein the first communication module and the second communication module are matched such that they will communicate with each other;

wherein the seat sensor further comprises a first logic module;

wherein the first logic module is a programmable electronic device that manages, regulates, and operates the seat sensor;

wherein the first logic module is housed in the sensor housing;

wherein the first GPS module, the first communication module, the first battery, and the temperature sensor are electrically connected to the first logic module;

wherein the first logic module takes a first action of determining the temperature measured by the temperature sensor;

wherein the first logic module makes a first decision of whether the temperature sensor is measuring the body temperature of a passenger in the child safety seat;

wherein the first logic module takes a second action of querying the first GPS module to get the GPS coordinates of the seat sensor;

wherein the first logic module then takes a third action of sending a first message through the first communication module to the second communication module;

wherein the first message is a notification that is sent from the first logic module to a second logic module;

wherein the first message notifies the second logic module of the GPS coordinates of the seat sensor.

2. The passenger detection and safety system according to claim 1 wherein the alarm fob further comprises the second logic module;

wherein the second logic module is a programmable electronic device manages, regulates, and operates the alarm fob;

wherein the second logic module is housed in the alarm housing;

wherein the second GPS module, the second communication module, the second battery, and the speaker are electrically connected to the second logic module;

wherein the second logic module takes a fourth action of querying the second communication module;

wherein the second logic module makes a second decision to determine if the first message has been received;

wherein the second logic module takes a fifth action of querying the second GPS module to get the GPS coordinates of the alarm fob;

wherein the second logic module next takes a sixth action of comparing the GPS coordinates of the seat sensor to the GPS coordinates of the alarm fob;

wherein the second logic module makes a third decision to determine whether the span of the distance between the seat sensor and the alarm fob is greater than the predetermined allowable maximum distance;

wherein the second logic module takes an eighth action of initiating an audible alarm over the speaker;

wherein the second logic module takes a seventh action of discontinuing the audible alarm over the speaker.

3. The passenger detection and safety system according to claim 1 wherein the speaker is a buzzer.

* * * * *